June 9, 1959     L. H. MORIN     2,890,067
UNIVERSAL LAMP SWIVEL CONNECTORS
Filed March 22, 1954     2 Sheets-Sheet 1
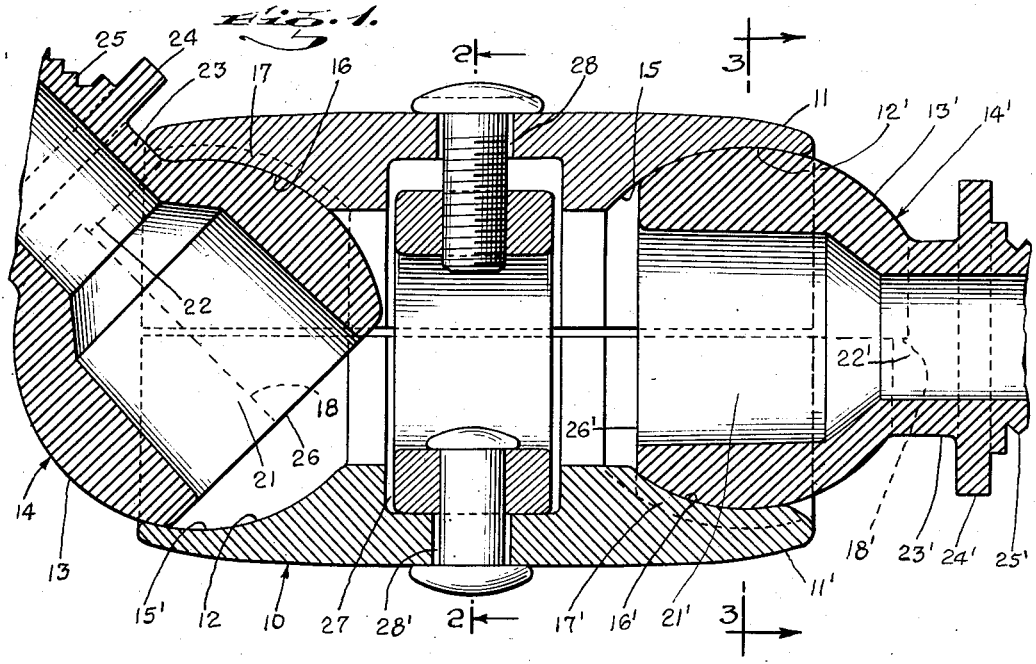
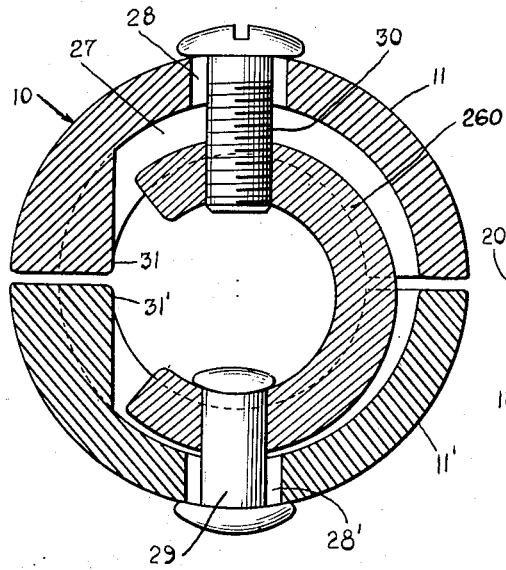
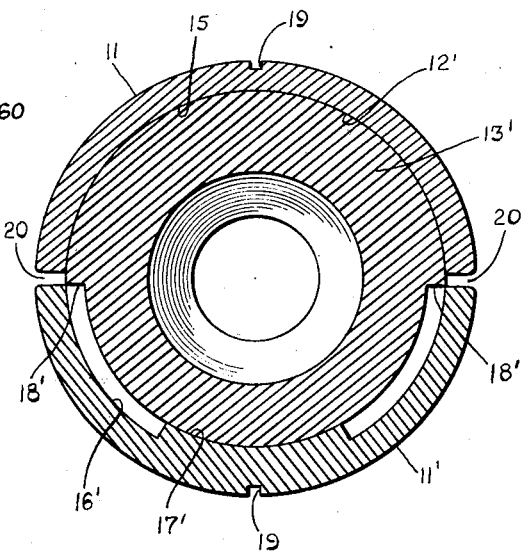
INVENTOR
LOUIS H. MORIN
BY
*Howard E. Thompson*
ATTORNEY June 9, 1959 L. H. MORIN 2,890,067
UNIVERSAL LAMP SWIVEL CONNECTORS
Filed March 22, 1954 2 Sheets-Sheet 2
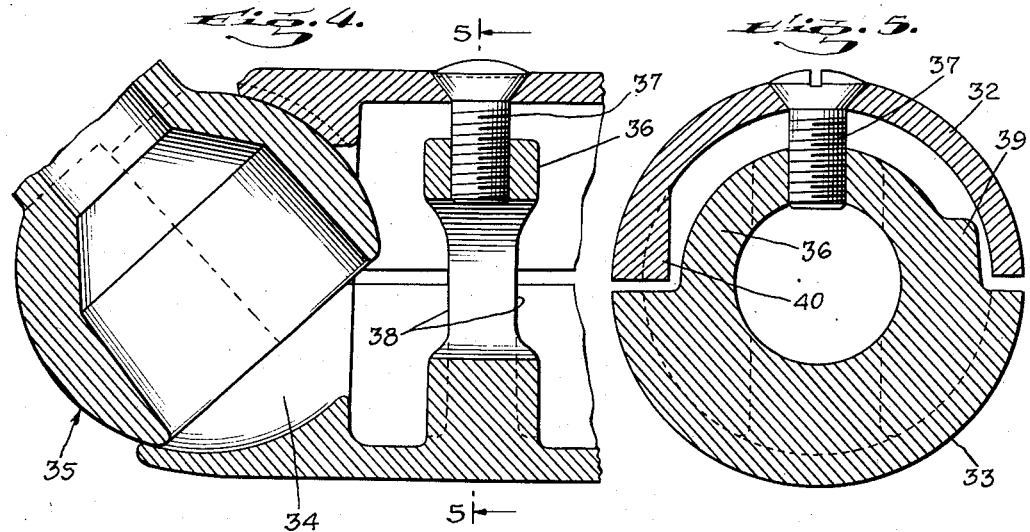
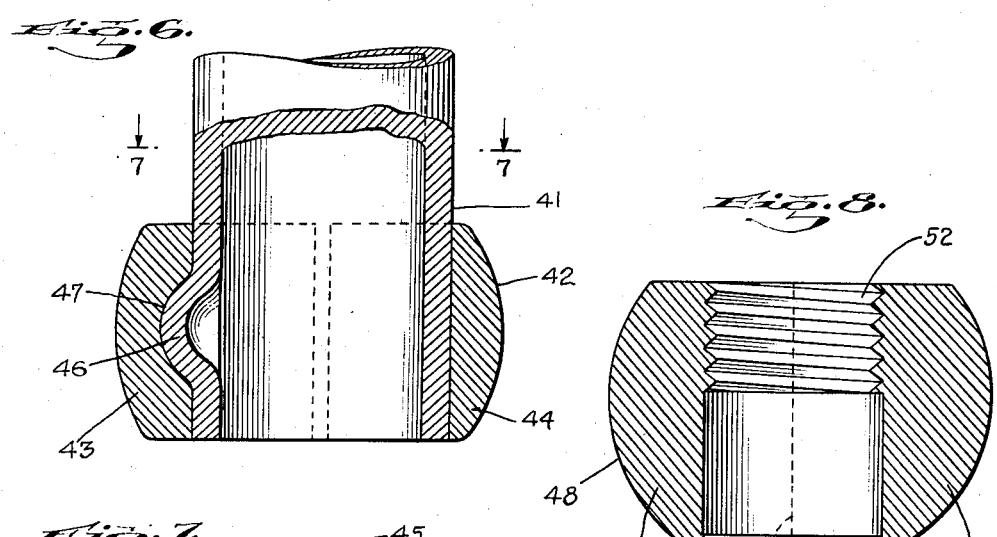
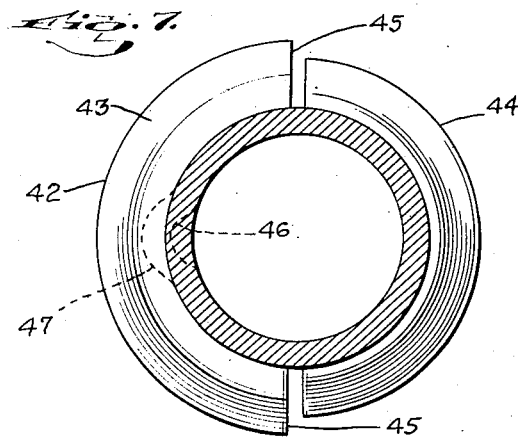
INVENTOR
LOUIS H. MORIN
BY
Howard T. Thompson
ATTORNEY United States Patent Office 2,890,067
Patented June 9, 1959

2,890,067

UNIVERSAL LAMP SWIVEL CONNECTORS

Louis H. Morin, Bronx, N.Y.

Application March 22, 1954, Serial No. 417,543

13 Claims. (Cl. 285—166)

This invention relates to swivel connectors for use in conjunction with lamps, lighting fixtures and the like. More particularly, the invention deals with a connector of the character described, composed of a plurality of die cast parts, with means for securing casing parts in frictional or tensional engagement with swivel parts in producing the resulting connector.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is an enlarged sectional view through one form of connector which I employ, showing swivels in different positions and with parts of the construction broken away.

Fig. 2 is a section on the line 2—2 of Fig. 1 with parts shown in elevation and background omitted.

Fig. 3 is a section on the line 3—3 of Fig. 1, showing a slight modification and showing the parts in different position.

Fig. 4 is an irregular view, similar to Fig. 1.

Fig. 5 is a section on the line 5—5 of Fig. 4 with part of the construction shown in elevation and background omitted.

Fig. 6 is a sectional detailed view of a modified form of swivel which I employ, detached from its connector casing.

Fig. 7 is a section on the line 7—7 of Fig. 6; and

Fig. 8 is a sectional view through another form of swivel which I employ.

In Figs. 1 to 3, inclusive, I have shown one form of universal swivel connector, Fig. 3 of which further illustrates a slight modification and, in these figures, 10 represents the casing which is composed of two similar parts 11, 11', the casing parts collectively forming socket end portions 12, 12' for the reception of ball-like ends 13, 13' of swivels or ball members 14, 14'.

Each part 11, 11' has a one diameter rounded socket portion 15, 15' and a two diameter socket portion 16, 16', these socket portions 15, 15'; 16, 16' collectively forming the sockets 12, 12'. The two diameter socket portions 16, 16' include the inwardly extending circumferentially wide rib portions 17, 17' which form stops checking rotary movement of the ball ends 13, 13' in the respective sockets 12, 12'. In this connection, it will be apparent that the ball ends 13, 13' include two circumferential diameter portions which are joined by shoulders 18, 18'; note in this connection Fig. 3 of the drawing. These shoulders are adapted to strike the ribs 17, 17' in limiting rotary movement of the swivels 14, 14' in two directions. The degree of this movement will be controlled by the circumferential dimensions of the ribs 17, 17', as well as positioning of the shoulders 18 on the ball ends 13, 13'.

In Fig. 3, it will be noted that a slight modification is shown in providing on the casing parts 11, 11' longitudinally extending grooves 19 to simulate the split or parting lines or spaces 20 between side edges of the parts to create a balanced appearance in the overall structure of the casing 10.

The swivel elements 14, 14' are tubular in form and have, within the ball ends, large chambers 21, 21' opening into smaller diameter tubular extensions 22, 22' which pass through neck portions 23, 23'. Adjacent the neck portions are annular flanges or collars 24, 24' and, beyond the collars, the tubular portions are externally threaded, as partially seen at 25, 25' for securing the swivels to electric fixtures, tubes or the like of lamps or other electrical appliances. The inner end portions of the ball ends 13, 13' are flattened, as seen at 26, 26' so as to provide large clearances for free passage of electric circuit wires through the swivels and regardless of the positions of the swivels in the sockets 12, 12' of the casing 10.

It will appear from the lefthand side of Fig. 1 that the necks 23 engage the ends of the casing in checking swinging movement of the swivels so as to prevent displacement of the swivels from the casing 10. The couplings of the swivels 14, 14' with the casing 10 are substantially universal, except for the checking of rotary movement to the predetermined degree desired, as previously referred to.

One of the distinctive features of my connector structure resides in the provision of means for spring loading of the assemblage in order to maintain the connector unit under constant frictional tension. To accomplish this spring loading, I provide a substantially U-shaped or horseshoe-shaped spring 260, note Fig. 2, which is arranged in a central hollowed portion 27 of the casing 10. The hollowed portion 27 has alined apertures 28, 28' formed in the parts 11, 11', a rivet 29 being utilized to fix one end of the spring 260 in the casing part 11'; whereas a screw 30 engages the other end portion of the spring 260 and the casing part 11. As the screw 30 is tightened, the casing parts 11, 11' are drawn together and the spring 260 is placed under tension to provide the desired frictional tensional engagement of the sockets 12, 12' with the ball ends 13, 13' of the swivels 14, 14', as will be apparent.

It will be noted from a consideration of Fig. 2 of the drawing that inwardly projecting lugs or shoulders 31, 31' are formed on the casing parts 11, 11' so as to assist in the initial assemblage of the casing parts to designate to the operator proper assemblage of the parts and to avoid wrong positioning of the spring 260 within the parts. In other words, the two shoulders 31, 31' must be in alinement in order to provide clearance for the spring 260. This brings the two similar casing parts automatically into proper relationship so as to dispose one of the two diameter sockets or portions 16, 16' at each end of the resulting assemblage.

In Figs. 4 and 5, I have shown a slight modification of the structure shown in Figs. 1 to 3, in which two different casing parts 32, 33 are employed, note Fig. 5 of the drawing. These casing parts collectively form, at each end, sockets, one of which is shown at 34 and these sockets will be the same as the sockets 12, 12' shown in Fig. 1. At 35 is shown a swivel element, identical with the swivels 14, 14'. Instead of employing the independent spring, such as the spring 260, the casing part 33 includes an arched portion or extension 36, with which a screw 37 is coupled. The arched portion 36 has recessed sides, as noted at 38 in Fig. 4 of the drawing which provide free movement of the circuit wires through the connector and, with the construction shown in Fig. 5, the casing part 32 is placed under slight tension in the coupling of the parts to establish the yieldable frictional engagement of the socket ends, as at 34, with the swivels 35.

It will be noted from a consideration of Fig. 5 of the drawing that the arched portion 36 includes, at one side, an outward projection 39; whereas, the casing 32 has, adjacent the opposed side, an inward projection 40. These projections control proper alinement of the parts 32 and 33 one with respect to the other, it being apparent that the projections 39 and 40 would interfere with each other if the parts were misassembled.

In Figs. 6 and 7, I have shown a modified form of swivel structure which comprises a suitable tubular fitting or coupling 41 of any type or kind. In fact, the tubular portion 41 might constitute part of an electric fixture and at 42 I have shown a swivel head or ball-like member composed of a large diameter portion 43 and the small diameter portion 44; note in this connection Fig. 7 of the drawing. This produces a ball end, much similar to the ball ends 13, 13', the different diameters producing shoulders, as at 45, similar to the shoulders 18. The head 42 is keyed to the tubular portion 41 by an outwardly extending beaded portion 46 formed in the tube 41 and extending into a recess 47 in the part 43 of the head. The parts 43 and 44 are assembled on the tube and then placed within the socket of the connector, similar to the sockets 12 or 34. The connector casing parts secured together automatically retains the parts 43, 44 in position, it being understood that the part 44 is free to move on the tube within the limits of the shoulders 45; whereas, the part 43 is definitely keyed against movement on the tubular portion 41.

In Fig. 8, I have shown another form of swivel element comprising head 48 which is a solid tubular structure having a rounded small diameter portion 49 and a rounded large diameter portion 50, these portions being joined by shoulders, similar to the shoulders 18 and 45, and the dotted line 51 of Fig. 8 represents one of these shoulders. The tubular body of the swivel ball 48 is internally threaded, as seen at 52, for coupling of a pipe or fitting of any type or kind therewith. The ball ends 48 are otherwise similar to the ends 13, 13' or 35 in all respects and will operate in sockets similar to the sockets 12, 12' or the socket 34.

Another advantage of my improved universal swivel connector resides in the fact that circuit wires can be readily threaded through the connector without disassemblage of the parts, free passages being provided through the several parts of the connector and, at the same time, ample clearance is provided within the connector for movement of the circuit wires as and when the swivel ends or members are moved into different positions with respect to the coupling casing. By producing the several parts of the connector as die castings, universal swivel connectors of the kind under consideration can be economically produced and assemblage of the parts simplified and, at the same time, extremely practical connectors are provided for the intended uses.

Having fully described my invention, what I claim as new and desire to secure by Letters Patent is:

1. A swivel connector comprising a tubular casing composed of two identical, oppositely disposed, spaced apart, die cast halves, means on each half for alining said halves one relatively to the other, a socket in each end portion of the casing, an enlarged recess intermediate said sockets and communicating therewith; a pair of identical, hollow, open-ended, die cast swivels having ball-like ends mounted for universal movement in the sockets of said casing; means comprising a U-shaped spring member disposed in said recess for tensionally supporting the casing halves on said ends, said spring member being spaced from and out of contact with said ends, one arm of said spring member being secured to one of said halves and the other arm extending along and being spaced from the other half, a threaded opening in said other arm, an aperture in said other casing half which opens through a wall thereof, a screw disposed in said aperture and engaging said threaded opening for securing the casing halves together and for adjusting the tension on said ends; each said end having circumferentially extending, integral, large and small diameter portions that extend toward each other and meet to form a pair of spaced, oppositely disposed shoulders, said large diameter portion being disposed on one side of an axial plane passing through said end and said small diameter portion being disposed on the other side thereof, each said diameter portion covering a substantial part of the area of said end, said shoulders extending longitudinally of said end and throughout the length thereof; each said socket having a circumferentially extending, integral rib portion in contact with the small diameter portion of said end and over which said end is slidably movable, said rib portion extending longitudinally of said socket and throughout the length thereof; said end being rotatable in said socket about the longitudinal axis of the connector, said shoulders in the course of rotation of the end in either direction being engageable with a side of said rib portion to limit said rotation but not said universal movement of the end; and said connector having a continuous passage extending generally centrally through said swivels and said spring member for receiving and disposing electrical wiring therein without disassembly of the connector.

2. A swivel connector comprising a tubular casing composed of two identical, oppositely disposed, spaced apart, die cast halves, a socket in each end portion of the casing, an enlarged recess intermediate said sockets and communicating therewith; a pair of identical, hollow, open-ended, die cast swivels having ball-like ends mounted for universal movement in the sockets of said casing; means comprising a spring member disposed in said recess for tensionally supporting the casing halves on said ends, said spring member being spaced from and out of contact with said ends, one end portion of said spring member being secured to one of said halves and the other end portion extending toward and being spaced from the other half, a tension regulating member connecting said other end portion with said other casing half for securing the casing halves together and for adjusting the tension on said ends; each said end having a pair of spaced, oppositely disposed, integral shoulders extending longitudinally of said end and throughout the length thereof; each said socket having a circumferentially extending, integral rib portion in contact with said end and over which said end is slidably movable, said rib portion extending longitudinally of said socket and throughout the length thereof; said end being rotatable in said socket about the longitudinal axis of the connector, said shoulders in the course of rotation of the end in either direction being engageable with a side of said rib portion to limit said rotation but not said universal movement of the end; and said connector having a continuous passage extending generally centrally through said swivels and said spring member for receiving and disposing electrical wiring therein without disassembly of the connector.

3. A swivel connector comprising a casing composed of two spaced apart, die cast parts, a socket in each end portion of the casing, a recess intermediate said sockets and communicating therewith; a pair of hollow, open-ended, die cast swivels having ball-like ends mounted for universal movement in the sockets of said casing; means comprising a spring member disposed in said recess for tensionally supporting the casing parts on said ends, said spring member being spaced from and out of contact with said ends, said spring member being secured to one of said parts and having a portion extending toward and spaced from the other part, a tension regulating member connecting said spring portion with said other part for securing the casing parts together and for adjusting the tension on said ends; each said end having a pair of spaced shoulders, each said socket having a rib portion in contact with said end and over which said end is slidably movable, said end being rotatable in said socket about the longitudinal axis of the connector, said shoulders in the course of rotation of the end in either direction being engageable with a side of said rib portion to limit said rotation but not said universal movement of the end; and said connector having a continuous passage extending generally centrally through said swivels and said spring member for receiving and disposing electrical wiring therein without disassembly of the connector.

4. A swivel connector comprising a casing composed of two transversally spaced parts, a socket in each end of the casing, a pair of tubular swivel elements comprising ball members disposed in said sockets for universal movement therein, said casing parts engaging each said members; an apertured portion intermediate said members and mounted on one of said casing parts, said portion having an extension disposed toward but spaced from the other casing part, said apertured portion being spaced from and out of contact with said members; adjustable means connecting said extension with said other casing part for securing said parts together and supporting the same in engagement with said members; and the apertures through said tubular elements and said portion extending axially thereof and forming a generally centrally located passage through said connector.

5. The swivel connector of claim 4 wherein said apertured portion is a separate piece.

6. The swivel connector of claim 4 wherein said apertured portion is integral with said one casing part.

7. The swivel connector of claim 4 wherein each said ball member is rotatable in the socket thereof about the longitudinal axis of the connector, each ball member and socket having stop means interengageable in the course of rotation of the ball member in either direction to limit said rotation but not said universal movement of the ball member.

8. The swivel connector of claim 7 wherein said stop means comprises a pair of spaced, oppositely disposed shoulders on said ball member and a circumferentially extending rib portion in said socket over which said member is slidably movable, said rib portion having opposed sides engageable by said shoulders.

9. The swivel connector of claim 8 wherein each swivel element comprises said ball member joined to a tubular portion.

10. The swivel connector of claim 9 wherein said ball member and tubular portion are integral.

11. The swivel connector of claim 9 wherein said ball member and tubular portion comprise separate pieces, said tubular portion being keyed to said ball member by means of an interengaging projection and recess.

12. The swivel connector of claim 11 wherein said ball member comprises two spaced parts of different diameters.

13. The swivel connector of claim 8 wherein said ball member comprises two parts of different diameters.

References Cited in the file of this patent

UNITED STATES PATENTS

| | | |
|---|---|---|
| 493,719 | Henderson | Mar. 21, 1893 |
| 993,702 | Miller | May 30, 1911 |
| 1,455,441 | La Hodny | May 15, 1923 |
| 1,671,975 | Aveling | June 5, 1928 |
| 1,760,845 | Kettering et al. | May 27, 1930 |
| 1,787,638 | Moore | Jan. 6, 1931 |
| 1,927,703 | Glowacki | Sept. 19, 1933 |
| 2,029,532 | Karcher | Feb. 4, 1936 |
| 2,041,847 | Marchand | May 26, 1936 |
| 2,052,069 | Arras | Aug. 25, 1936 |
| 2,071,270 | Dellinger | Feb. 16, 1937 |
| 2,085,922 | Moore | July 6, 1937 |
| 2,147,491 | Le Bus | Feb. 14, 1939 |
| 2,329,369 | Haver | Sept. 14, 1943 |
| 2,533,494 | Mitchell | Dec. 12, 1950 |

FOREIGN PATENTS

| | | |
|---|---|---|
| 688,685 | Great Britain | Mar. 11, 1953 |